United States Patent
Yang et al.

(10) Patent No.: US 8,472,993 B2
(45) Date of Patent: Jun. 25, 2013

(54) DOWNLINK AND UPLINK PATHLOSS ESTIMATION GAP ADJUSTMENT SCHEME FOR WIRELESS SYSTEMS

(75) Inventors: Rongzhen Yang, Shanghai (CN); Hujun Yin, Saratoga, CA (US); Jin Fu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 12/969,819

(22) Filed: Dec. 16, 2010

(65) Prior Publication Data
US 2012/0157150 A1 Jun. 21, 2012

(51) Int. Cl.
*H04B 7/00* (2006.01)
*H04W 52/04* (2009.01)

(52) U.S. Cl.
USPC ........ 455/522; 455/69; 455/67.11; 455/452.2

(58) Field of Classification Search
USPC .......... 455/522, 69, 453, 67.16, 452.2, 67.11, 455/452.1, 501, 515, 517, 63.1
See application file for complete search history.

(56) References Cited

U.S. PATENT DOCUMENTS

| | | | |
|---|---|---|---|
| 6,498,932 B1 * | 12/2002 | Silventoinen et al. | 455/424 |
| 6,792,276 B1 * | 9/2004 | Butovitsch et al. | 455/453 |
| 2008/0188215 A1 * | 8/2008 | Bergstrom et al. | 455/424 |

OTHER PUBLICATIONS

"DRAFT Amendment to IEEE Standard for Local and metropolitan area networks: Part 16: Air Interface for Broadband Wireless Access Systems", IEEE P802.16m/D7, LAN/MAN Standards Committee, Jul. 29, 2010, pp. 82-85, 382-390, 603, 767, 772.

* cited by examiner

*Primary Examiner* — John J Lee
(74) *Attorney, Agent, or Firm* — Cool Patent, P.C.

(57) ABSTRACT

Briefly, in accordance with one or more embodiments, a pathloss gap between a downlink pathloss from a base station to a mobile station and an uplink pathloss from the mobile station to the base station is estimated. An initial offset value for uplink power control of the estimated pathloss gap is calculated based at least in part on said estimating. An offset value for an uplink data channel or an uplink control channel, or combinations thereof, is set based at least in part on the initial offset value. The pathloss gap for uplink power control is compensated using the set offset value.

24 Claims, 5 Drawing Sheets

DOWNLINK AND UPLINK PATHLOSS ESTIMATION GAP ADJUSTMENT SCHEME FOR WIRELESS SYSTEMS

BACKGROUND

In Fourth Generation (4G) wireless communication systems such as those compliant with a Worldwide Interoperability for Microwave Access (WiMAX), a Third Generation Partnership Project (3GPP) Long Term Evolution (LTE) or a Fourth Generation (4G) standard, the uplink power control unit should compensate the uplink pathloss by using the downlink pathloss measurement as the estimated value for the uplink pathloss. However, in a frequency-division duplexing (FDD) system or systems where there may be gain mismatch between the uplink gain and the downlink gain, for example a remote repeater system, there may be a gap, or difference, between the downlink pathloss and the uplink pathloss. In general, the downlink pathloss is smaller in magnitude than the uplink pathloss. As a result, the estimated value of the uplink pathloss is typically smaller than the actual uplink pathloss. Such a smaller estimated value for the uplink pathloss results in the mobile station transmitting at a less than sufficient power level to the base station. The smaller uplink pathloss estimated value would make the mobile station transmit an insufficient amount of power than needed, which may not be a problem since during the connected mode the base station can measure the uplink signal quality and decide the offset value to operate the gap. However, during initial network entry or when the mobile station recovers from an idle state, it is possible to result in a serious issue for the mobile station in which the initial network entry process cannot be completed and the mobile station may fail to connect to the base station.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
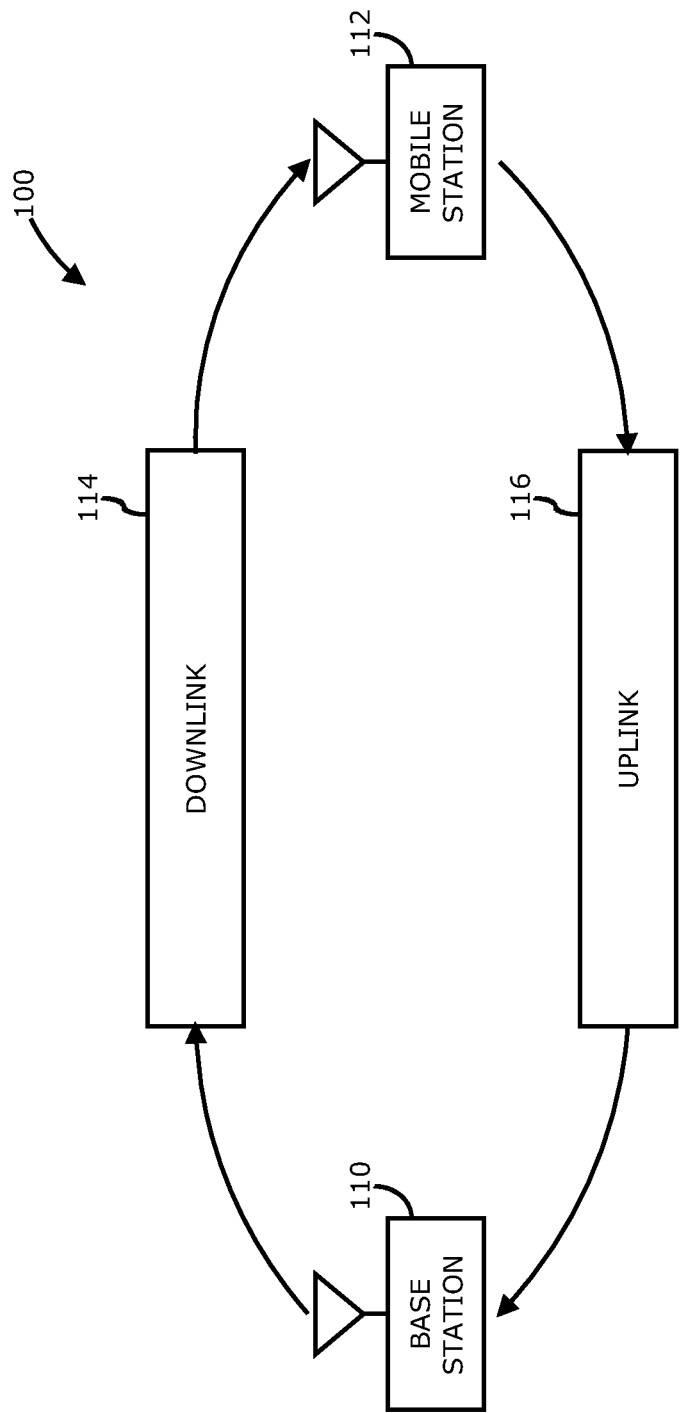
FIG. 1 is a diagram of a wireless network showing a downlink and an uplink between a mobile station and a base station in a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a wireless network showing a downlink and an uplink between a mobile station and a base station in a wireless network in accordance with one or more embodiments will be discussed. As shown in FIG. 1, a wireless network 100 may comprise, among other network elements, a base station 110 communicating with a mobile station 112 via downlink 114 communications. Likewise, mobile station 112 may communicate with base station 110 via uplink 116 communications. In some embodiments, base station 110 may comprise a base transceiver station (BTS), an advanced base station (ABS), a relay station (RS), or an advanced relay station (ARS), although the scope of the claimed subject matter is not limited in this respect. Likewise, mobile station 112 may comprise an advanced mobile station (AMS) or generically a subscriber station (SS), although the scope of the claimed subject matter is not limited in this respect.

In one or more embodiments, wireless network 100 may implement estimation of the gap between the downlink 114 and uplink 116 pathloss, and to compensate for the estimated gap. In such embodiments, wireless network 100 may be compliant with an Institute of Electrical and Electronics Engineers (IEEE) standard such as the IEEE 802.16m standard, and/or a Third Generation Partnership Project Long Term Evolution (3GPP LTE) cellular network, and/or future generations thereof, such as a Fourth Generation (4G) cellular standard, although the scope of the claimed subject matter is not limited in this respect. The IEEE 802.16m standard is hereby incorporated herein by reference in its entirety. In one more particular embodiments, wireless network 100 may implement estimation of the downlink and uplink pathloss gap based on the processing of initial ranging, and then the estimated gap may be compensated based at least in part on the estimated gap. In one or more embodiments, compensation of the estimated gap may be implemented by two example methods:

1. The estimated gap is set as initial offset vales for mobile station 112. As adopted in the IEEE 802.16m standard, the initial offset values are reported from the mobile station 112 to the base station 110 by an initial ranging request (AAI-RNG-REQ) message.
2. A terminal only implementation method in which the estimated gap is applied directly into the pathloss estimation value with no changes for air-interface messages.

Both of the above methods may be implemented within an IEEE 802.16 and/or a Long Term Evolution (LTE) standard/system accordingly, although the methods may likewise be implemented in various other wireless broadband networks. For example, the methods may be implemented in an IEEE 802.16e standard, an IEEE 802.16m standard in the next generation Worldwide Interoperability for Microwave Access (WiMAX II) air interface, a Third Generation Partnership Long Term Evolution (3GPP LTE) system, a 3GPP Ultra Mobile Broadband (3GPP UMB) system, and so on, and the scope of the claimed subject matter is not limited in these respects. An example of such a broadband wireless network is shown in and described with respect to FIG. 2, below.

Figure 2:
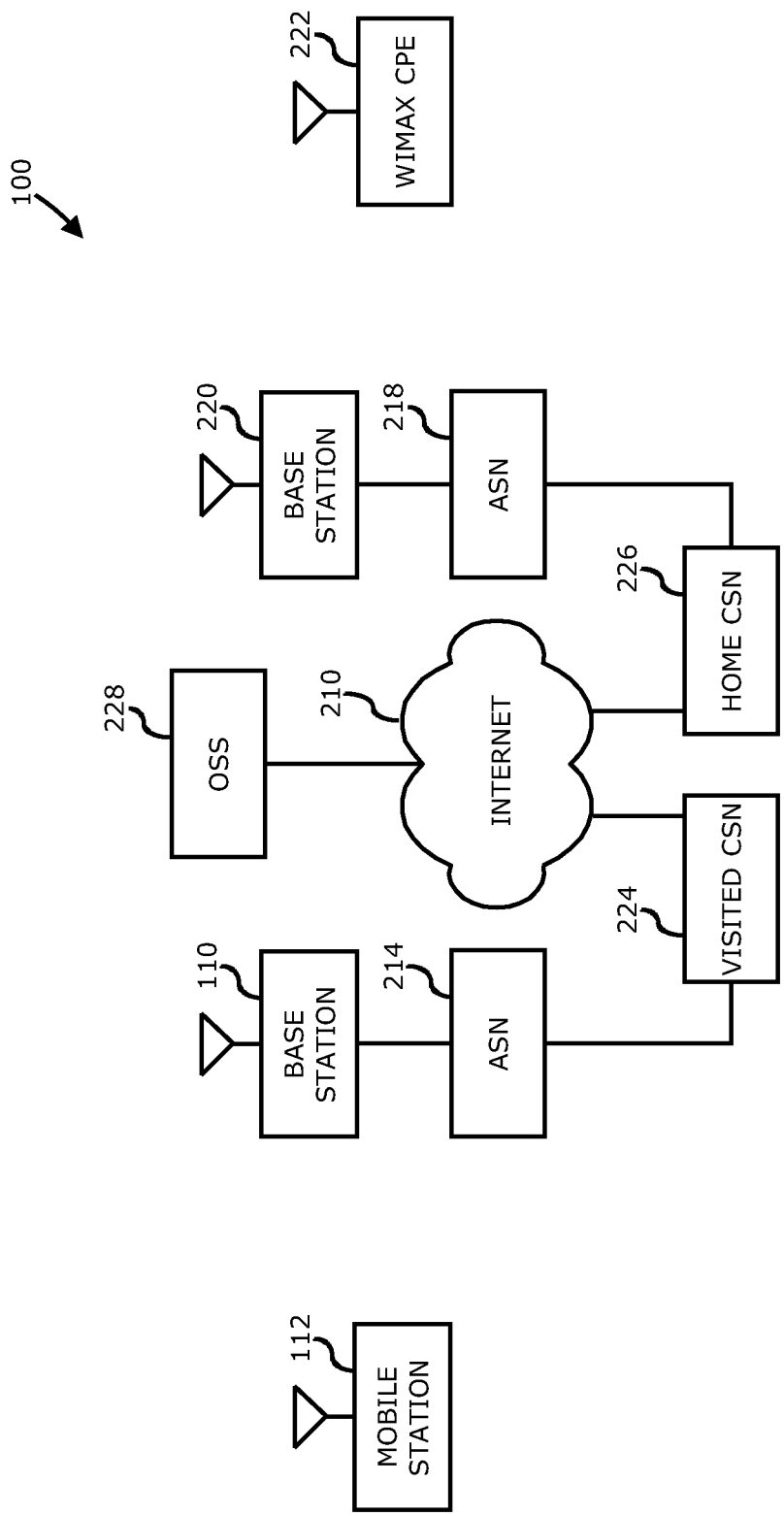
FIG. 2 is a block diagram of a broadband wireless network capable of estimating and compensating a downlink and uplink pathloss gap in accordance with one or more embodiments.

Referring now to FIG. 2, a block diagram of a broadband wireless network capable of implementing methods for estimating and compensating a downlink and uplink pathloss gap in accordance with one or more embodiments will be discussed. As shown in FIG. 2, network 100, which may correspond to an expanded embodiment of network 100 of FIG. 1, may be an internet protocol (IP) type network comprising an internet 210 type network or the like that is capable of supporting mobile wireless access and/or fixed wireless access to internet 210. In one or more embodiments, network 100 may be in compliance with a Worldwide Interoperability for Microwave Access (WiMAX) standard or future generations of WiMAX such as WiMAX-II, and in one particular embodiment may be in compliance with an Institute for Electrical and Electronics Engineers 802.16m standard (IEEE 802.16m). In one or more alternative embodiments network 100 may be in compliance with a Third Generation Partnership Project Long Term Evolution (3GPP LTE or just LTE) or a 3GPP2 Air Interface Evolution (3GPP2 AIE) standard or future generations such as Fourth Generation (4G) standards and so on. In general, network 100 may comprise any type of orthogonal frequency division multiple access (OFDMA) based wireless network, and the scope of the claimed subject matter is not limited in these respects.

As an example of mobile wireless access, access service network (ASN) 214 is capable of coupling with base station (BS) 110 to provide wireless communication between mobile station (MS) 112 and internet 210. Mobile station 112 may comprise a mobile type device or information handling system capable of wirelessly communicating via network 100, for example a notebook type computer, a cellular telephone, a personal digital assistant, tablet, or the like. ASN 214 may implement profiles that are capable of defining the mapping of network functions to one or more physical entities on network 100. Base station 110 may comprise radio equipment to provide radio-frequency (RF) communication with mobile station 112, and may comprise, for example, the physical layer (PHY) and media access control (MAC) layer equipment in compliance with an IEEE 802.16m type standard. Base station 110 may further comprise an internet protocol (IP) backplane to couple to internet 210 via ASN 214, although the scope of the claimed subject matter is not limited in these respects.

Network 100 may further comprise a visited connectivity service network (CSN) 224 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VOIP) gateways, and/or internet protocol (IP) type server functions, or the like. However, these are merely example of the types of functions that are capable of being provided by visited CSN 224 or home CSN 226, and the scope of the claimed subject matter is not limited in these respects. Visited CSN 224 may be referred to as a visited CSN in the case for example where visited CSN 224 is not part of the regular service provider of mobile station 112, for example where mobile station 112 is roaming away from its home CSN such as home CSN 226, or for example where network 100 is part of the regular service provider of mobile station but where network 100 may be in another location or state that is not the main or home location of mobile station 112. In a fixed wireless arrangement, WiMAX type customer premises equipment (CPE) 222 may be located in a home or business to provide home or business customer broadband access to internet 210 via base station 220, ASN 218, and home CSN 226 in a manner similar to access by mobile station 112 via base station 110, ASN 214, and visited CSN 224, a difference being that WiMAX CPE 222 is generally disposed in a stationary location, although it may be moved to different locations as needed, whereas mobile station 112 may be utilized at one or more locations if mobile station 112 is within range of base station 110 for example. In accordance with one or more embodiments, operation support system (OSS) 228 may be part of network 100 to provide management functions for network 100 and to provide interfaces between functional entities of network 100. Network 100 of FIG. 2 is merely one type of wireless broadband network showing a certain number of the components and network elements of network 100, however the scope of the claimed subject matter is not limited in these respects. A method to estimate a gap between the downlink and uplink pathloss on network 100 is shown in and described with respect to FIG. 3, below.

Figure 3:
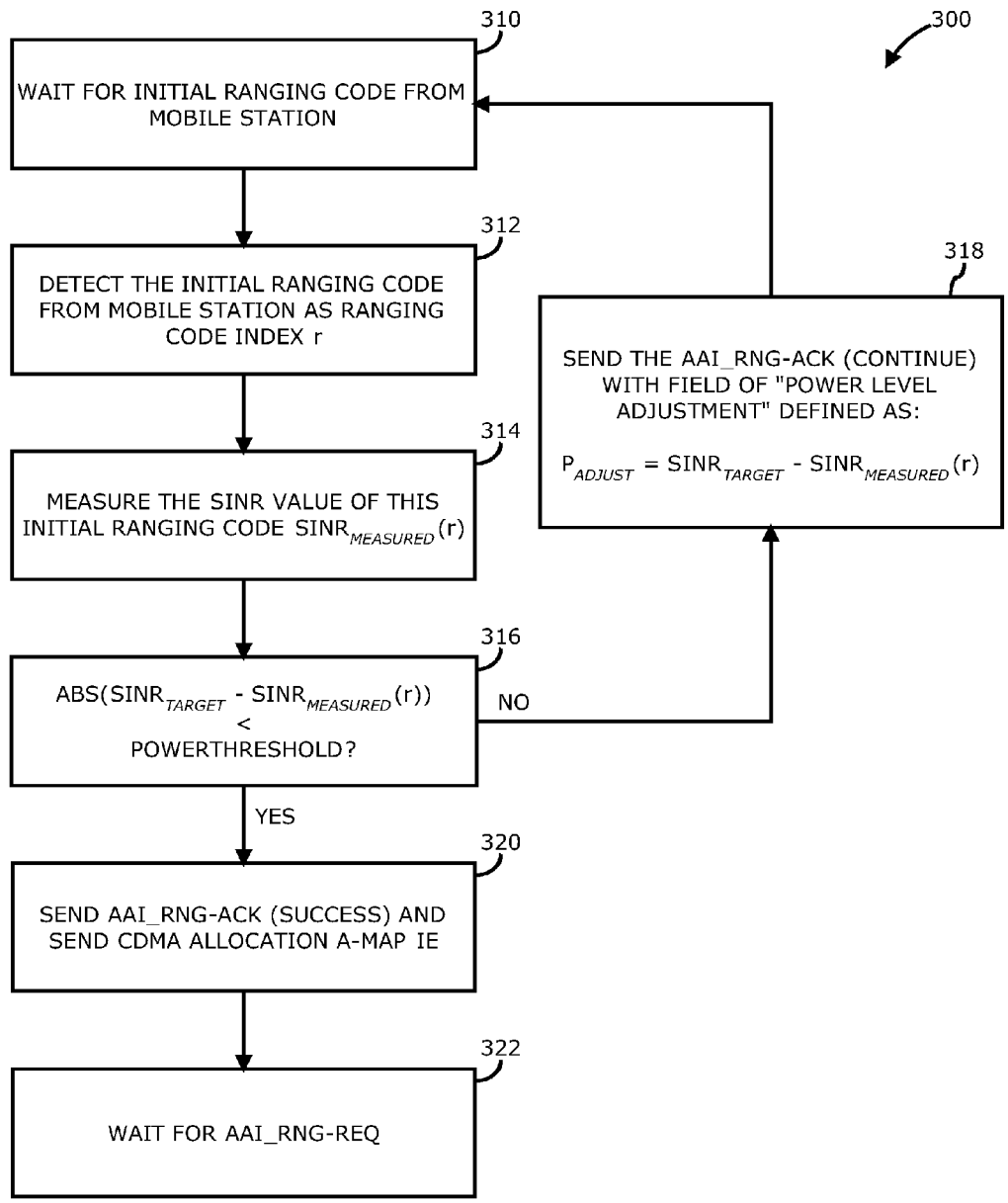
FIG. 3 is a flow diagram of a method to estimate a gap between the downlink and uplink pathloss gap in accordance with one or more embodiments.

Referring now to FIG. 3, a flow diagram of a method to estimate a gap between the downlink and uplink pathloss in accordance with one or more embodiments will be discussed. Although FIG. 3 shows one particular order of method 300, it should be noted that the blocks of method 300 may be arranged in various other orders using more or fewer blocks than shown in FIG. 3, and the scope of the claimed subject matter is not limited in these respects. The method 300 shown in FIG. 3 may be implemented by base station 110 of wireless network 100 of FIG. 1. For initial network entry of mobile station 112 onto network 100 in an orthogonal frequency-division multiple access (OFDMA) system, a process for initial network entry may be implemented. First, initial ranging occurs which is used to start the communication link between base station 110 and mobile station 112. During initial ranging, the mobile station 112 will perform power ramping, for example as specified in the IEEE 802.16m standard, until the base station 110 can detect the mobile station 112 initial ranging code. After the base station 110 detects the mobile station 112 initial ranging code, the base station 110 may send the initial ranging acknowledgement (AAI_RNG-ACK) message as defined in the 802.16m standard with a power level adjustment value to adjust the power of the mobile station 112. Accordingly, base station 110 implements the method 300 to estimate the gap between the downlink and uplink pathloss, wherein the gap is the difference in value between the downlink pathloss and the uplink pathloss.

As shown in FIG. 3, at block 310 base station 110 waits for an initial ranging code from the mobile station 112. At block 312, upon detecting the initial ranging code from the mobile station 112, the ranging code index r will be used as the Ranging Preamble Code Index for the initial ranging acknowledgement (AAI_RNG-ACK) message. At block 314, the base station 112 measures the received signal to interference-plus-noise (SINR) ratio of the detected initial ranging code as $SINR_{Measured}(r)$. At decision block 316, the SINR value of the detected initial ranging code as measured at block 314 is compared with a target initial ranging code SINR value using the following comparison:

$$ABS(SINR_{Target} - SINR_{Measured}(r)) < PowerThreshold$$

In the above comparison, PowerThreshold is a power threshold value set by the base station 110, and $SINR_{Target}$ is the target SINR value of the initial ranging code. The target SINR value of the initial ranging code may be calculated by:

$$SINR_{Target} = targetInitialRangingSINR + offsetControl$$

wherein the targetInitialRangingSINR may be as defined in the IEEE 802.16m standard which is hereby incorporated herein by reference, and in one or more embodiments targetInitialRangingSINR may be defined as 0 dB, although the scope of the claimed subject matter is not limited in this respect. The targetInitialRangingSINR is a value defined by the base station 110 to be sent at the code division multiple access (CDMA) Allocation AMAP IE defined in the IEEE 802.16m specification. If the comparison of block 316 cannot be met (NO), at block 318, the power adjustment will be performed using the message AAI_RNG-ACK in a "continue" mode as defined in the IEEE 802.16m specification in which method 300 continues at block 310. The "Power Level Adjustment" value will be calculated as:

$$P_{Adjust} = SINR_{Target} - SINR_{Measured}(r)$$

Method 300 may iterate with block 310, block 312, block 314, block 316 and block 318 until the power of the mobile station 112 has been sufficiently adjusted wherein the comparison of block 316 is satisfied. In the event the comparison of block 316 is satisfied (YES), at block 320 the mobile station 110 has been adjusted for the for the appreciated power level for the initial ranging code, the initial network entry of the mobile station 112 will continue by sending the AAI-RNG_ACK (SUCCESS) and the code division multiple access allocation map information element (CDMA Allocation A-MAP IE). At block 322, base station 110 waits for the AAI-RNG_REQ message from the mobile station 112, for example as defined in the IEEE 802.16m standard as "Initial Network Entry". After completion of method 300, the power level of the mobile station 112 has been adjusted for an appropriate power level for the initial ranging code wherein the pathloss gap is obtained from the power adjustment value $P_{Adjust}$. Compensation of the pathloss gap may be performed using the power adjustment value as shown in and describe with respect to FIG. 4, below.

Figure 4:
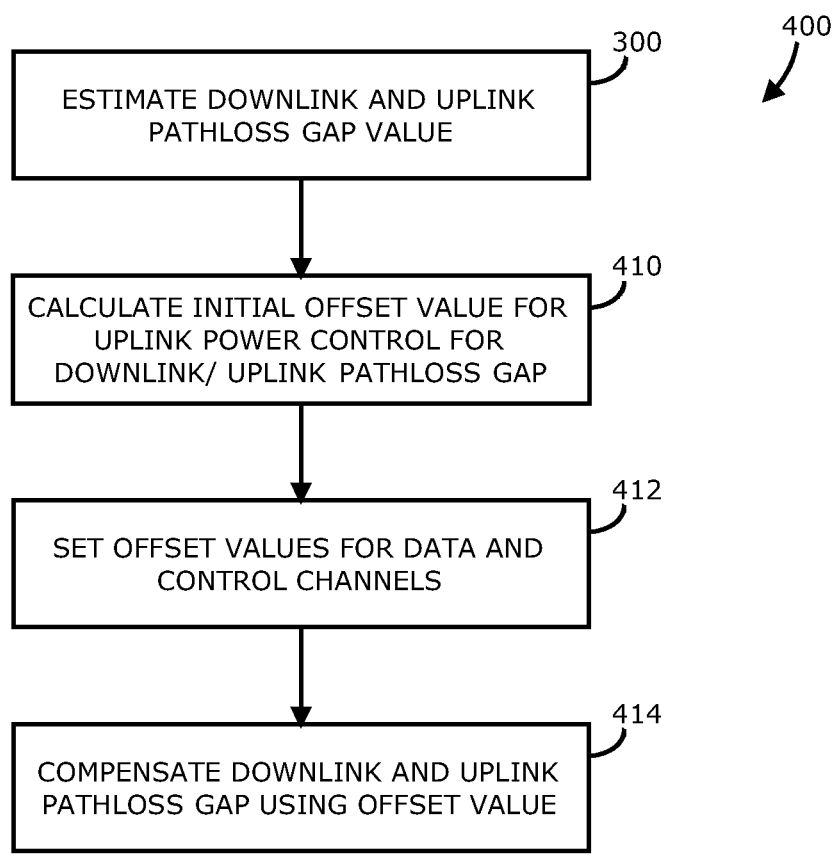
FIG. 4 is a flow diagram of a method to compensate for the estimated gap between the downlink and uplink pathloss gap in accordance with one or more embodiments.

Referring now to FIG. 4, a flow diagram of a method to compensate for the estimated gap between the downlink and uplink pathloss gap in accordance with one or more embodiments will be discussed. Although FIG. 4 shows one particular order of method 400, it should be noted that the blocks of method 400 may be arranged in various other orders using more or fewer blocks than shown in FIG. 4, and the scope of the claimed subject matter is not limited in these respects. As shown in FIG. 4, the method 400 to compensate for the pathloss gap may first obtain an estimate of the pathloss gap between the downlink and uplink at block 300 which corresponds to method 300 of FIG. 3. Block 300 may yield the power adjustment value $P_{Adjust}$ to obtain the pathloss gap estimate. After execution of block 300, the initial offset value for uplink power control for the downlink and uplink pathloss gap may be calculated at block 410. The initial offset value of uplink power control may be calculated as follows:

$$Offset_{Initial} = P_{TX\_IR\_Final} - (L + SINR_{InitialRanging} + NI) - 10\log_{10}(RangingSubcarrierNum)$$

where:
L is the estimated average current downlink propagation loss calculated by the mobile station 112, including transmit antenna gain and pathloss;
NI is the estimated average power level (dBm) of the noise and interference per subcarrier at the base station 110, as indicted in an uplink power control message AAI_ULPC_NI;
$SINR_{InitialRanging}$ is defined from method 300 of FIG. 1;
RangingSubcarrierNum is the number of the initial ranging subcarrier as defined in the IEEE 802.16m standard; and
$P_{TX\_IR\_Final}$ is the final initial ranging transmission power defined blow as:

$$P_{TX\_IR\_Final} = P_{TX\_IR\_MIN} + N \times P_{IR,Step} + \Sigma P_{RNG-ACK}(m)$$

In the above equation,
$P_{IR, Step}$ is the step size of power ramping up, which in one or more embodiments is 2 dB as defined in the IEEE 802.16m standard, although the scope of the claimed subject matter is not limited in this respect;
N is the times of power ramping up;
$P_{RNG-ACK}(m)$ is the mth power level adjustment value carried by AAI_RNG-ACK as defined in method 300, in other words the mth value of $P_{Adjust}$; and
PTX_IR_MIN is the initial ranging power setting defined in the IEEE 802.16m standard.

After getting the initial offset value $Offset_{Initial}$ at block 410, the data and control offset value may be set at block 412. The data offset value is set as:

$$Offset_{Data} = Offset_{Initial}$$

The control offset value is set as:

$$Offset_{Control} = Offset_{Initial} + offsetControl$$

where offsetControl is the value carried by the field "offsetControl" in the CDMA Allocation A-MAP IE defined in the IEEE 802.16m standard. Then, after the power control offset value of data and control are set at block 412, the downlink and uplink pathloss gap may be compensated at block 414 using the data offset value and control offset value for continuous communication between base station 110 and mobile station 112. An example information handling system that may tangibly embody base station 110 and/or mobile station 112 is shown in and described with respect to FIG. 5, below.

Figure 5:
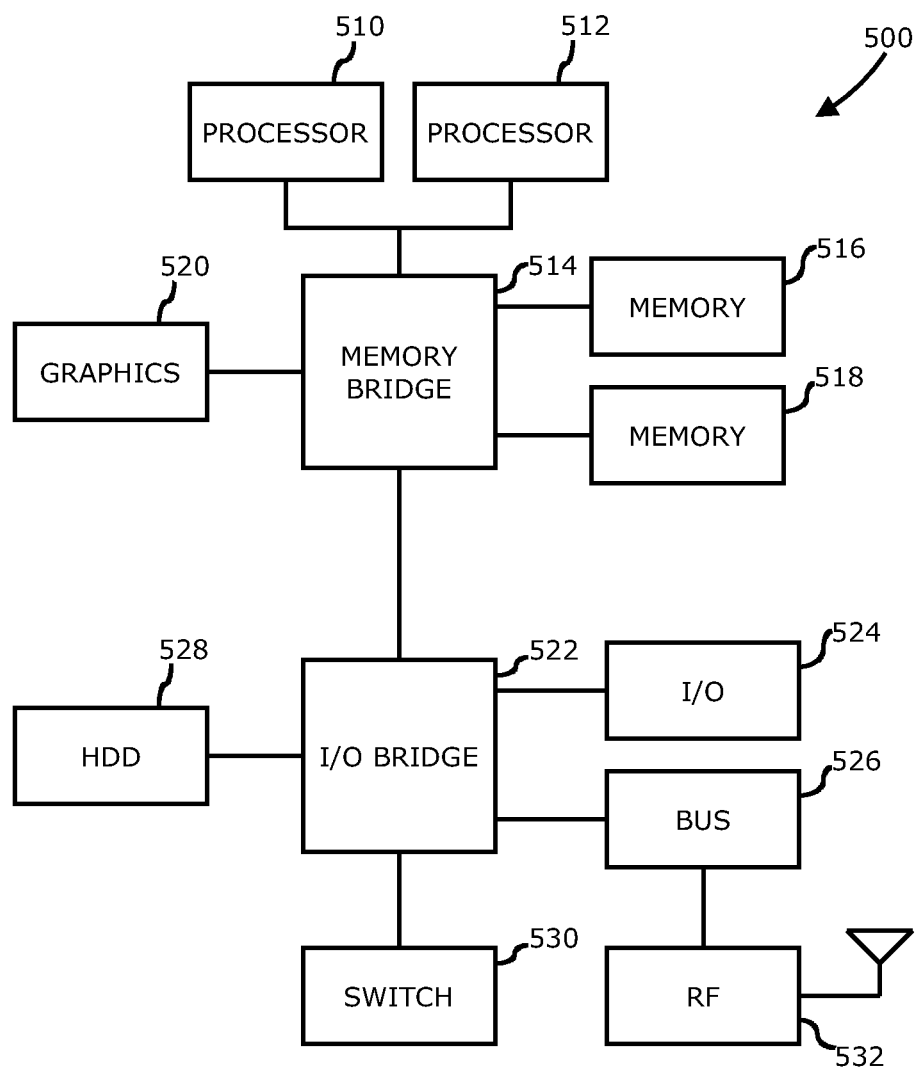
FIG. 5 is a block diagram of an information handling system capable of implementing uplink power control in a wireless network in accordance with one or more embodiments.

Referring now to FIG. 5, a block diagram of an information handling system capable of implementing uplink power control in a wireless network in accordance with one or more embodiments. Information handling system 500 of FIG. 5 may tangibly embody one or more of any of the network elements of network 100 as shown in and described with respect to FIG. 1 and/or FIG. 2. For example, information handling system 500 may represent the hardware of base station 110 and/or mobile station 112, with greater or fewer components depending on the hardware specifications of the particular device or network element. Although information handling system 500 represents one example of several types of computing platforms, information handling system 500 may include more or fewer elements and/or different arrangements of elements than shown in FIG. 5, and the scope of the claimed subject matter is not limited in these respects.

Information handling system 500 may comprise one or more processors such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor based memory, for example volatile type memory and/or non-volatile type memory. Memory bridge 514 may couple to a graphics system 520 to drive a display device (not shown) coupled to information handling system 500.

Information handling system 500 may further comprise input/output (I/O) bridge 522 to couple to various types of I/O systems. I/O system 524 may comprise, for example, a universal serial bus (USB) type system, an IEEE 1394 type system, or the like, to couple one or more peripheral devices to information handling system 500. Bus system 526 may comprise one or more bus systems such as a peripheral component interconnect (PCI) express type bus or the like, to connect one or more peripheral devices to information handling system 500. A hard disk drive (HDD) controller system 528 may couple one or more hard disk drives or the like to information handling system, for example Serial ATA type drives or the like, or alternatively a semiconductor based drive comprising flash memory, phase change, and/or chalcogenide type memory or the like. Switch 530 may be utilized to couple one or more switched devices to I/O bridge 522, for example Gigabit Ethernet type devices or the like. Furthermore, as shown in FIG. 5, information handling system 500 may include a radio-frequency (RF) block 532 comprising RF circuits and devices for wireless communication with other wireless communication devices and/or via wireless networks such as network 100 of FIG. 1 and/or FIG. 2, for example where information handling system 500 embodies base station 110 and/or mobile station 112, although the scope of the claimed subject matter is not limited in this respect. Furthermore, in one or more embodiments, method 300 of FIG. 3 and/or method 400 of FIG. 4 may be tangibly embodied as instructions stored on an article of manufacture such as memory 516 and/or memory 518 that, if executed by a machine such as processor 510 and/or processor 512, result in execution of method 300 and/or method 400, excluding transient signals only to the extent such subject matter may be non-statutory, but encompassing all statutory subject matter, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a downlink and uplink pathloss estimation gap adjustment scheme for wireless systems and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    estimating a pathloss gap between a downlink pathloss from a base station to a mobile station and an uplink pathloss from the mobile station to the base station;
    calculating an initial offset value for uplink power control of the estimated pathloss gap based at least in part on said estimating;
    setting an offset value for an uplink data channel or an uplink control channel, or combinations thereof, based at least in part on the initial offset value; and
    compensating the pathloss gap for uplink power control using the set offset value.

2. A method as claimed in claim 1, wherein said estimating the pathloss gap is based at least in part on a downlink reference signal.

3. A method as claimed in claim 1, wherein said estimating the pathloss gap is based at least in part on an initial ranging signal between the mobile station and the base station.

4. A method as claimed in claim 1, wherein said estimating comprises:
    detecting an initial ranging code transmitted from the mobile station;
    measuring the signal-to-interference-plus-noise ratio of the initial ranging code;
    determining if a difference between the measured signal-to-interference-plus-noise ratio of the initial ranging code and a target value is less than a power threshold; and
    transmitting a continue acknowledgement message to the mobile station and the difference as a power adjust signal to the mobile station if the difference is not less than the power threshold.

5. A method as claimed in claim 4, further comprising continuing said detecting, said measuring, said determining, and said transmitting until the difference is less than the power threshold.

6. A method as claimed in claim 4, further comprising, if the difference is less than the power threshold, transmitting a success acknowledgment message and a CDMA allocation map information element to the mobile station.

7. A method as claimed in claim 6, wherein an end value of the power adjust signal is used in said calculating.

8. A method as claimed in claim 6, wherein the offset value for the data channel is calculated based at least in part on an initial ranging power or an initial ranging subcarrier, or combinations thereof.

9. A method as claimed in claim 6, wherein the offset value for the control channel is calculated based at least in part on an offset control value in the CDMA allocation map information element.

10. A method, comprising:
    measuring a downlink pathloss from a base station to a mobile station;
    estimating a gap between the downlink pathloss from the base station and the mobile station, and the uplink pathloss from the mobile station to the base station based at least in part on the measured downlink pathloss;

calculating the uplink pathloss as a difference between the measured downlink pathloss and the estimated gap; and compensating uplink power control from the mobile station to the base station using the uplink pathloss calculated in said calculating.

11. A method as claimed in claim 10, wherein said estimating is based at least in part on an initial ranging between the mobile station and the base station.

12. A method as claimed in claim 10, wherein said estimating the gap comprises:

setting the estimated gap as initial offset values for the mobile station;

ramping up a power transmitted by the mobile station until the base station is capable of detecting an initial ranging code from the mobile station; and updating the estimated gap based at least in part on a power adjustment value based at least in part on the initial ranging code.

13. An apparatus, comprising:

a processor;

a radio-frequency transmitter coupled to the processor; and a memory coupled to the processor, wherein instructions stored in the memory configure the processor to:

estimate a pathloss gap between a downlink pathloss from a base station to a mobile station and an uplink pathloss from the mobile station to the base station;

calculate an initial offset value for uplink power control of the estimated pathloss gap based at least in part on the estimate;

set an offset value for an uplink data channel or an uplink control channel, or combinations thereof, based at least in part on the initial offset value;

receive one more additional offset values from the mobile station; and compensate the pathloss gap for uplink power control using the set offset value and the one or more additional offset values received from the mobile station.

14. An apparatus as claimed in claim 13, wherein the estimate of the pathloss gap is based at least in part on a downlink reference signal.

15. An apparatus as claimed in claim 13, wherein the estimate of the pathloss gap is based at least in part on an initial ranging signal between the mobile station and the base station.

16. An apparatus as claimed in claim 13, wherein the processor is further configured to:

detect an initial ranging code transmitted from the mobile station;

measure the signal-to-interference-plus-noise ratio of the initial ranging code;

determine if a difference between the measured signal-to-interference-plus-noise ratio of the initial ranging code and a target value is less than a power threshold; and transmit a continue acknowledgement message to the mobile station and the difference as a power adjust signal to the mobile station if the difference is not less than the power threshold.

17. An apparatus as claimed in claim 16, wherein the processor is further configured to repeatedly continue to detect, measure, determine, and transmit until the difference is less than the power threshold.

18. An apparatus as claimed in claim 16, wherein if the difference is less than the power threshold, the processor is further configured to transmit a success acknowledgment message and a CDMA allocation map information element to the mobile station.

19. An apparatus as claimed in claim 18, wherein an end value of the power adjust signal is used to calculate the initial offset value.

20. An apparatus as claimed in claim 18, wherein the offset value for the data channel is calculated based at least in part on an initial ranging power or an initial ranging subcarrier, or combinations thereof.

21. A method as claimed in claim 18, wherein the offset value for the control channel is calculated based at least in part on an offset control value in the CDMA allocation map information element.

22. An apparatus, comprising:

a processor;

a radio-frequency transmitter coupled to the processor; and a memory coupled to the processor, wherein instructions stored in the memory configure the processor to:

measure a downlink pathloss from a base station to a mobile station;

estimate a gap between the downlink pathloss from the base station and the mobile station, and the uplink pathloss from the mobile station to the base station based at least in part on the measured downlink pathloss and one or more offset values received from the mobile station;

calculate the uplink pathloss as a difference between the measured downlink pathloss and the estimated gap; and compensate uplink power control from the mobile station to the base station using the calculated uplink pathloss.

23. An apparatus as claimed in claim 22, wherein said estimating is based at least in part on an initial ranging between the mobile station and the base station.

24. An apparatus as claimed in claim 22, wherein the processor is further configured to:

set the estimated gap as initial offset values for the mobile station;

ramp up a power transmitted by the mobile station until the base station is capable of detecting an initial ranging code from the mobile station; and update the estimated gap based at least in part on a power adjustment value based at least in part on the initial ranging code.

* * * * *